(12) United States Patent
Hiller (10) Patent No.: US 9,698,704 B2
(45) Date of Patent: Jul. 4, 2017

(54) MODULAR HIGH-FREQUENCY CONVERTER, AND METHOD FOR OPERATING SAME

(71) Applicant: Siemens Aktiengesellschaft, München (DE)

(72) Inventor: Marc Hiller, Lauf an der Pegnitz (DE)

(73) Assignee: Siemens Aktiengesellschaft, München (DE)

( * ) Notice: Subject to any disclaimer, the term of this patent is extended or adjusted under 35 U.S.C. 154(b) by 33 days.

(21) Appl. No.: 14/765,012

(22) PCT Filed: Jan. 16, 2014

(86) PCT No.: PCT/EP2014/050783
§ 371 (c)(1),
(2) Date: Jul. 31, 2015

(87) PCT Pub. No.: WO2014/118008
PCT Pub. Date: Aug. 7, 2014

(65) Prior Publication Data
US 2015/0372611 A1    Dec. 24, 2015

(30) Foreign Application Priority Data
Jan. 31, 2013 (EP) ..................................... 13153502

(51) Int. Cl.
*H02M 7/797* (2006.01)
*H02M 7/48* (2007.01)
(Continued)

(52) U.S. Cl.
CPC ............. *H02M 7/797* (2013.01); *H02M 7/48* (2013.01); *B60L 2210/42* (2013.01);
(Continued)

(58) Field of Classification Search
CPC ......... H02M 2001/0074; H02M 5/458; H02M 7/48; H02M 2007/4835; H02M 7/797
See application file for complete search history.

(56) References Cited

U.S. PATENT DOCUMENTS 7,577,008 B2    8/2009    Hiller
7,835,166 B2    11/2010   Hiller
(Continued)

FOREIGN PATENT DOCUMENTS

DE    10103031 A1    7/2002
DE    10237553 A     3/2004
(Continued)

OTHER PUBLICATIONS

Angquist, Lennart et al. "Inner control of Modular Multilevel Converters—An approach using open-loop estimation of stored energy," Power Electronics Conference (IPEC), 2010 International, Sapporo, 2010, pp. 1579-1585. URL: http://ieeexplore.ieee.org/stamp/stamp.jsp?tp=&arnumber=5544607&isnumber=5542000.*
(Continued)

*Primary Examiner* — Fred E Finch, III
(74) *Attorney, Agent, or Firm* — Henry M. Feireisen, LLC (57) ABSTRACT

A converter includes multiple submodules that are serially connected on the input side to a DC power supply circuit via an inductor. Each submodule has an input-side half bridge and an at least single-phase output-side full bridge and an intermediate circuit capacitor connecting the half bridge and the full bridge forming an intermediate DC voltage circuit. According to the method, the submodules are alternately connected to the power supply circuit, thereby also connecting the intermediate circuit capacitor of the respective connected submodule to the power supply circuit, and the intermediate circuit voltage dropping across the respective intermediate circuit capacitor of each submodule is mea-
(Continued)

sured. The submodule to be connected is selected according to the voltage deviation of the corresponding intermediate circuit voltage from a specified target voltage value.

7 Claims, 5 Drawing Sheets

(51) Int. Cl.
*H02M 7/483* (2007.01)
*H02M 1/00* (2006.01)

(52) U.S. Cl.
CPC ............ *H02M 2001/0074* (2013.01); *H02M 2007/4835* (2013.01); *Y02T 10/7241* (2013.01); *Y02T 90/16* (2013.01)

(56) References Cited

U.S. PATENT DOCUMENTS

| | | | |
|---|---|---|---|
| 8,138,632 B2 | 3/2012 | Sommer et al. | |
| 8,476,854 B2 | 7/2013 | Blöcher et al. | |
| 8,537,578 B2 | 9/2013 | Hiller et al. | |
| 8,587,248 B2 | 11/2013 | Hiller | |
| 8,786,450 B2 | 7/2014 | Dietrich et al. | |
| 8,873,258 B2 | 10/2014 | Hiller et al. | |
| 2008/0232145 A1 | 9/2008 | Hiller et al. | |
| 2011/0049994 A1 | 3/2011 | Hiller et al. | |
| 2013/0049659 A1* | 2/2013 | Marquardt | H02M 7/797 318/400.23 |
| 2014/0002048 A1* | 1/2014 | Pang | H02M 11/00 323/304 |
| 2014/0022738 A1 | 1/2014 | Hiller et al. | |
| 2014/0145520 A1 | 5/2014 | Handt et al. | |
| 2014/0203645 A1* | 7/2014 | Leu | H02M 7/217 307/52 |
| 2014/0226377 A1* | 8/2014 | Goetz | H02M 3/158 363/65 |
| 2014/0355321 A1* | 12/2014 | Akagi | H02M 7/483 363/131 |
| 2015/0180352 A1* | 6/2015 | Mester | B60L 9/12 363/21.03 |
| 2016/0006080 A1* | 1/2016 | Lutze | H02M 7/48 429/7 |
| 2016/0261205 A1* | 9/2016 | Kolar | H02M 5/458 |

FOREIGN PATENT DOCUMENTS

| | | |
|---|---|---|
| DE | 102010008978 A1 | 8/2011 |
| WO | WO 2008086760 A1 | 7/2008 |

OTHER PUBLICATIONS

Antonopoulos, Antonios et al. "On dynamics and voltage control of the Modular Multilevel Converter," Power Electronics and Applications, 13th European Conference on, Barcelona, 2009, pp. 1-10. URL: http://ieeexplore.ieee.org/stamp/stamp.jsp?tp=&arnumber=5278794&isnumber=5278662.*

Glinka, Martin et al. "A new AC/AC multilevel converter family," in IEEE Transactions on Industrial Electronics, vol. 52, No. 3, pp. 662-669, Jun. 2005. URL: http://ieeexplore.ieee.org/stamp/stamp.jsp?tp=&arnumber=1435677&isnumber=30935.*

Siemaszko D. et al; "Evaluation of Control and Modulation Methods for Modular Multilevel Converters"; The 2010 International Power Electronics Conference ECCE Asia; pp. 746-753; ISBN: 978-1-42-445394-8; DOI: 10.1109/IPEC.2010.5544609; XP055066778 (2013Q12876).

Lambertz Lukas et al; "Modularer Hochfrequenz Umrichter für Fahrzeugantriebe"; Institut für Leistungselektronik und Steuerungen, Universität der Bundeswehr München; VDE Verlag; EMA Fachtagung 08.-Sep. 9, 2010 in Aschaffenburg; pp. 47-53;ISBN 978-3-8007-3311-8; XP009163159 (2011Q13920).

Lambertz L. et al; "Modular converter systems for vehicle applications"; Emobility—Electrical Power Train, 2010, IEEE, Piscataway, NJ; pp. 1-6; ISBN: 978-1-4244-8410-2; XP031835669 (2013Q03500).

"A new modular voltage source inverter topology"; A. Lesnicar, R. Marquardt Institute of Power Electronics and Control Universität der Bundeswehr München XP-002454302 (2007Q25441).

* cited by examiner

MODULAR HIGH-FREQUENCY CONVERTER, AND METHOD FOR OPERATING SAME

CROSS-REFERENCES TO RELATED APPLICATIONS

This application is the U.S. National Stage of International Application No. PCT/EP2014/050783, filed Jan. 16, 2014, which designated the United States and has been published as International Publication No. WO 2014/118008 and which claims the priority of European Patent Application, Serial No. 13153502.3, filed Jan. 31, 2013, pursuant to 35 U.S.C. 119(a)-(d).

BACKGROUND OF THE INVENTION

The invention relates to a modular high-frequency converter. The invention further relates to a method for operating such a converter.

A converter circuit of the aforementioned type is disclosed in the publication by Lukas Lambertz et al., "Modularer Hochfrequenz Umrichter für Fahrzeugantriebe (Modular High-Frequency Converter for Vehicle Drives)", EMA 2010, 8-9, Sep. 2010, Aschaffenburg for supply of electric energy to the motor windings of an electric drive motor in a vehicle drive.

The known modular high-frequency converter (abbreviated to MHF converter) is designed to convert a DC voltage from a traction battery of the vehicle into a number of AC voltages. The individual AC voltages are created in such cases by a number of submodules, which are connected in series into the power supply circuit of the traction battery. In this converter each submodule is linked on its input side via a single-phase half bridge to the power supply circuit. To create the AC voltage each submodule has on its output side a single-phase full bridge (H bridge), which is connected via a load circuit to a phase winding of the drive motor of the vehicle. Within the submodules the input-side half bridges and the full bridge are connected in parallel together with an intermediate voltage capacitance in a (DC voltage) intermediate circuit.

In normal operation (drive mode) of the MHF converter, in which electrical power is transported from the power supply circuit via the submodules of the converter into the respective load circuit, the input half bridges are operated in conjunction with an inductance disposed in the circuit as a boost converter.

For this purpose the submodules are usually connected to the power supply circuit in a regularly alternating sequence. The input-side half bridges are usually activated for this purpose with periodic carrier signals, which are offset by the same phase angle. As a consequence of this activation the intermediate circuit capacitance of the respective connected submodule is connected into the power supply circuit for the duration of a connection pulse.

In addition to the drive mode, the input-side half bridges of the submodules can be operated in an energy recovery mode, in which the electrical power from the load circuit is fed back via the respective associated submodule into the power supply circuit. The input-side half bridges of the submodules are operated for this purpose as buck converters.

The intermediate circuit voltages of the submodules are regulated for each submodule individually by variation of the duration of the respective connection pulse.

SUMMARY OF THE INVENTION

The object underlying the invention is to improve an MHF converter and a method for its operation.

The invention is based on an MHF converter comprising a number of submodules. The submodules are connected here according to specification on the input side in series via an inductance into a power supply circuit fed from a DC voltage source. Each submodule has a half bridge on its input side (called the input bridge below) with which the submodule is connected into the power supply circuit. On its output side each submodule has an at least single-phase full bridge (called the output bridge below) with which the submodule is connected via a load circuit to a load to be controlled. Each submodule further has a (direct current) intermediate circuit in which the input bridge and the output bridge are connected in parallel. Also connected in the intermediate circuit—in a parallel connection to the input bridge and the output bridge—is an intermediate circuit capacitance.

The MHF converter is especially intended for use in the vehicle drive of an electric vehicle. In this application the traction battery (high-voltage battery) of the vehicle is intended as the direct current source for the power supply circuit. The load to be connected to the submodule on the output side especially involves an electric motor or a phase winding of such a motor. Preferably in such cases each phase winding of the electric motor is assigned its own submodule. As an alternative to this, within the framework of the invention however, a number of phase windings of a multiphase electric motor can be connected to a common submodule. The output bridge in this case is formed by a corresponding multi-phase full bridge. In a specific application of the invention a number of electric motors—which serve for example to selectively drive different wheels of the vehicle—are activated in parallel to one another by different submodules of the MHF converter. The intermediate circuit capacitance of each submodule is especially formed in each case by one or more capacitors.

Within the course of the method the intermediate circuit capacitances of the submodules are connected in turn by means of the respective assigned input bridge into the power supply circuit. The connection of the intermediate circuit capacitance of the submodule into the power supply circuit is subsequently abbreviated to "connecting" of the respective submodule to the power supply circuit. The submodule or each submodule of which the intermediate circuit capacitance is connected into the power supply circuit is subsequently referred to as the "connected submodule". As a rule a number of submodules are always connected simultaneously to the power supply circuit at any given point in time.

In accordance with the method the intermediate circuit voltage falling via the respective intermediate circuit capacitance of each submodule is now measured. The submodule or each submodule to be connected is selected in accordance with the invention on the basis of the voltage deviation of the associated intermediate circuit voltage from a predetermined target voltage value. In particular, in a preferred version of the method, at least the submodule with the maximum voltage deviation (especially with the greatest positive voltage deviation) or at least the submodule with the minimum voltage deviation (especially with the greatest negative voltage deviation) is always connected to the power supply circuit. The voltage deviation is assessed as positive in such cases if the measured intermediate circuit voltage exceeds the target voltage value. The voltage deviation is accordingly assessed as negative if the measured intermediate circuit voltage is below the target voltage value.

By selecting the submodules to be connected in accordance with the voltage deviation of the respective intermediate circuit voltage a balancing out of the power flow in the power supply circuit can be achieved in an especially simple but effective manner. In addition the number of switching processes of the input bridges can be reduced. The load on the converter components, especially the semiconductor switches of the input bridges, can thus be reduced.

The method thus makes it possible in such cases especially to predetermine the target voltage value for each submodule individually. Thus the submodules, as part of the invention, can optionally be regulated to the same or to different intermediate circuit voltages. For the latter case in particular, in the course of the method, the voltage deviation for each submodule is preferably explicitly calculated by comparing the respective measured intermediate circuit voltage with the associated target voltage value. Provided however the target voltage value is predetermined for all submodules as a uniform value (and thus equal) the voltage deviation is preferably not explicitly calculated. Instead in this case the intermediate circuit voltages are compared directly with one another, since the difference between the voltage deviations with the same target voltage values is known to be expressed directly in the difference of the measured intermediate circuit voltages.

In a more refined variant of the method, in addition to the intermediate circuit voltages, the current direction of the current flowing in the power supply circuit is determined and is taken into account in the choice of the submodule to be connected. In such cases preferably at least the submodule with the minimum (especially greatest negative) voltage deviation is always connected to the power supply circuit if the flow direction is positive. For a negative flow direction on the other hand the submodule with the maximum (especially greatest positive) voltage deviation is always connected to the power supply circuit.

A current flow with "positive current direction" is classified here within the meaning of technical current direction definition as a current flow directed from the plus pole to the minus pole of the DC voltage source. Conversely a current flow directed from the minus pole to the plus pole of the DC voltage source is classified as "negative".

The adaptation of the intermediate circuit voltages is thus undertaken in the method variant described above as a function of flow direction by active charging of part-discharged intermediate circuit capacitances and also by active discharging of overloaded intermediate circuit capacitances and is especially effective through this.

In an expedient embodiment of the method the input bridge of the connected submodule is activated in a clocked manner by means of an input control signal. The input control signal is expediently formed by a pulse signal which in each clock cycle of predetermined clock length has a pulse and a pulse pause with an adjustable degree of control (also known as pulse-pause ratio or duty cycle).

The variation of the degree of control makes it possible here within the course of the inventive method not only to regulate the individual intermediate circuit voltages, but independently hereof also the current flowing through the power supply circuit (supply current) according to demand. For voltage regulation the sum voltage, which is given by the sum of the measured intermediate circuit voltages of all submodules, is preferably established. From the deviation of this sum voltage from the sum of the target voltage values a target value for the power supply current is derived in this case. This target value in its turn is employed as an input variable for a downstream current regulation. Within the course of this current regulation the supply current is regulated by connecting and disconnecting submodules and thus by a variation of the total voltage falling (effective voltage) via the submodules in the power supply circuit.

In an easy-to-realize method variant, for each clock cycle of the input control signals, the submodule or each submodule to be connected is selected anew in accordance with the voltage deviations. Thus especially for each clock cycle—in accordance with one of the forms of embodiment of the method described previously—at least the submodule with the maximum (especially largest positive) or minimum (especially largest negative) voltage deviation established is connected to the power supply circuit.

In an alternate method variant the switch between the submodules to be connected is undertaken as a function of the effective voltage introduced above, i.e. dependent on the voltage which falls in total over the input circuits of the submodules connected in series. Submodules in such cases are only connected or disconnected if this effective voltage—to which only the connected submodules deliver a contribution differing from zero—deviates from a predetermined target value by more than a predetermined switching value. This switching value in such cases is selected as variable in the expedient embodiment of the method, so that it corresponds to half (half the amount) of the intermediate circuit voltage of the submodule to be connected or disconnected. The target value is expediently derived from the control variable output by the previously described current regulation.

In an expedient embodiment of the invention the MHF converter performs the inventive method automatically. To this end it includes a control device, which is configured in terms of its circuit and/or program to carry out the method, especially in one of the embodiment variants described previously. In this case the control device especially includes a microcontroller in which a control program (firmware) for carrying out the method in operation of the converter automatically is implemented in an executable form. As an alternative or in addition however the control device can also include, as part of the invention, at least one non-programmable hardware circuit (e.g. an ASIC) in which the function for automatically carrying out the method or a part thereof is implemented with circuit technology means.

As part of the invention the control device can be formed by a single (central) control unit activating all converter modules jointly, i.e. for example by a single microcontroller. As an alternative or in addition hereto, the control device, as part of the invention, can however also be structured entirely or partly decentrally, in that each converter module (at least also) is assigned a separate control unit.

BRIEF DESCRIPTION OF THE DRAWING

An exemplary embodiment of the invention is described in greater detail below with reference to a drawing, in which.

Parts and variables which correspond to one another are provided with the same reference characters in all figures.

DETAILED DESCRIPTION OF PREFERRED EMBODIMENTS

Figure 1:
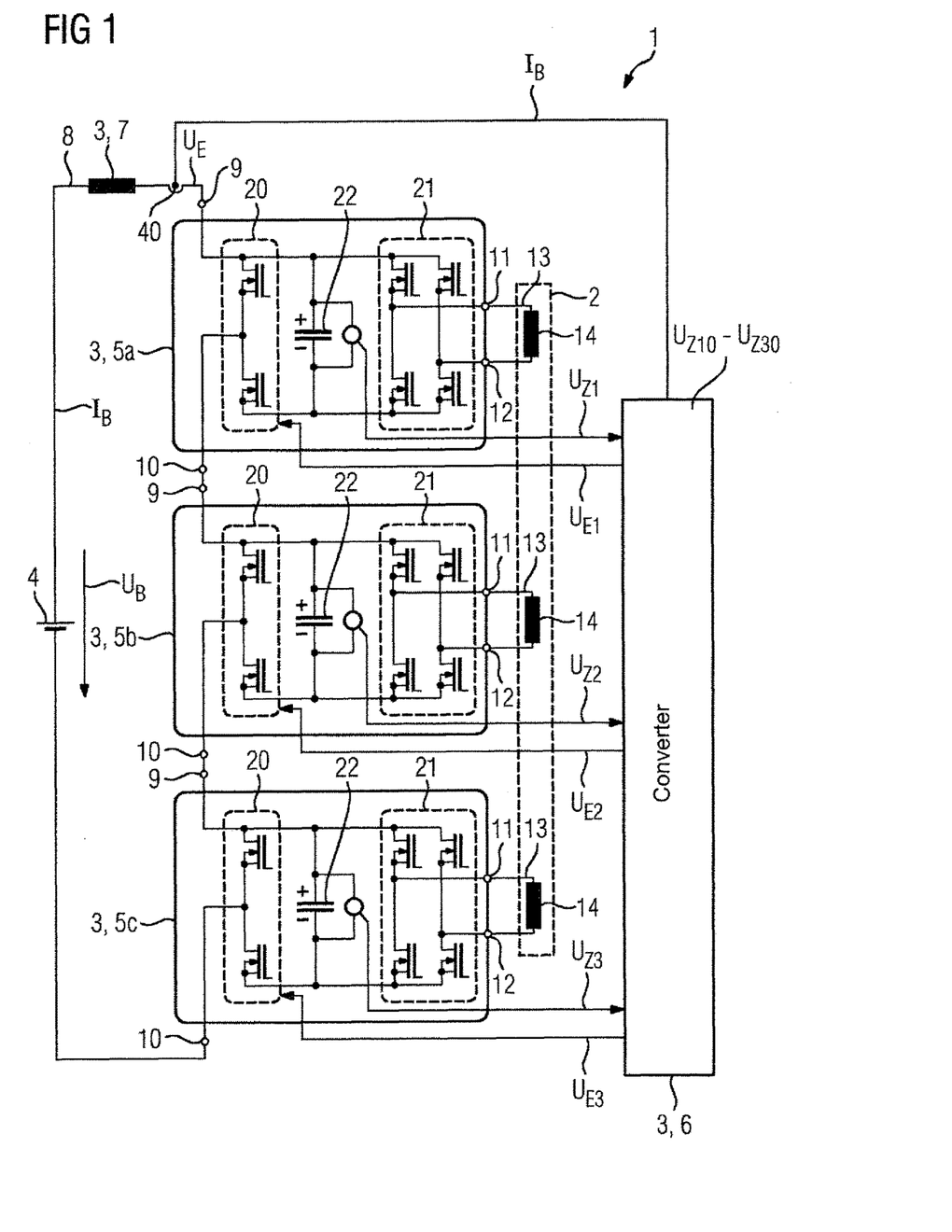
FIG. 1 shows in a schematically simplified electronic circuit diagram an MHF converter with three submodules connected in series, wherein each of the submodules comprises an input-side half bridge (input bridge), an output-side single-phase full bridge (output bridge) and a (DC voltage) intermediate circuit with an intermediate circuit capacitance, and also with a control unit for activating the submodules.

FIG. 1 shows a vehicle drive 1 for an electric vehicle (not shown in any greater detail). The vehicle drive 1, as its electric load for example, includes a three-phase electric (drive) motor 2 of the vehicle.

The vehicle drive 1 further comprises an (MHF) converter 3, which supplies the motor 2 with electrical power from an electrical DC voltage source. The DC voltage source in the example shown involves the (traction) battery 4 (also: high-voltage battery) of the vehicle.

The converter 3 in the example according to FIG. 1 comprises three submodules 5a, 5b and 5c. The converter 3 also includes a central control unit 6 as a control device as well as an inductance 7.

The inductance 7, which is especially realized in circuit technology terms via a coil, and the three submodules 5a-5c are connected in a series circuit via a power supply circuit (referred to below as the battery circuit 8) to the battery 4. Each submodule 5a-5c is connected here into the battery circuit 8 with two input terminals 9 and 10.

On the load side each of the submodules 5a-5c is connected in each case via two output terminals 11 and 12 and a load circuit 13 to the respectively assigned phase winding 14 of the motor 2.

Figure 2:
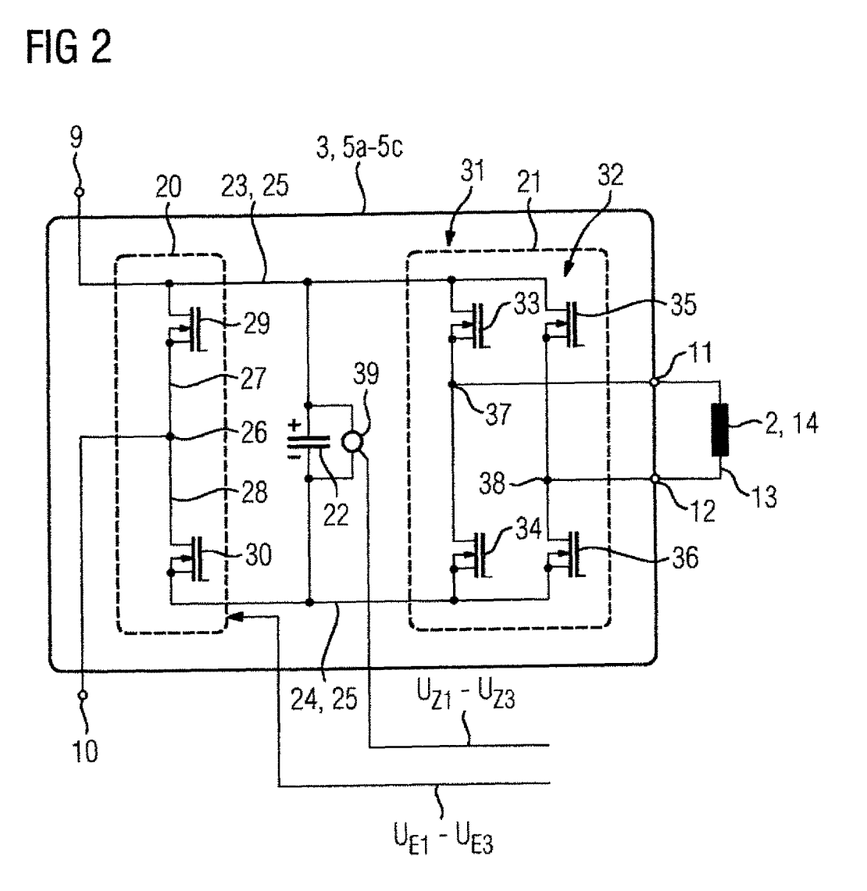
FIG. 2 shows an enlarged diagram of one of the submodules according to FIG. 1.

One of the identically constructed submodules 5a-5c is shown in greater detail in FIG. 2. As can be seen from this diagram, each submodule 5a-5c, on its input side, has a half bridge referred to below as the input bridge 20 and also on its load side has a single-phase full bridge (H bridge), referred to below as the output bridge 21. Each submodule 5a-5c further comprises an intermediate circuit capacitance 22 the form of a capacitor via which a capacitor voltage $U_{Z1}$, $U_{Z2}$ or $U_{Z3}$ drops. The input bridge 20, the output bridge 21 and the intermediate circuit capacitance 22 are connected here in parallel to one another between a plus rail 23 and a minus rail 24 of a (DC voltage) intermediate circuit 25.

The input bridge 20 has two branches 27 and 28 separated by a central tap 26, of which the branch 27 extends between the central tap 26 and the plus rail 23, and the branch 28 extends between the central tap 26 and the minus rail 24. Disposed in each of the branches 27, 28 is a (semiconductor) switch 29 or 30 which is formed by a MOSFET in each case. The input terminals 9 and 10 of each submodule 5a-5c are connected on both sides of the switch 29 to the plus rail 23 or to the central tap 26.

The output bridge 21 is formed from two half bridges 31 and 32 which are connected in parallel to one another between the plus rail 23 in the minus rail 24 of the intermediate circuit 25. Once again two semiconductor switches 33 and 34 or 35 and 36 are disposed in each of the two half bridges 31, 32. The switches 33-36 are again preferably formed by MOSFETs.

A central tap 37 between the two semiconductor switches 33 and 34 of the half bridge 31 is connected to the output terminal 11. A central tap 38 between the semiconductor switches 35 and 36 of the half bridge 32 is accordingly connected to the output terminal 12.

In operation of the converter 3 a battery voltage $U_B$ is applied to the converter 3 by the battery 4 via the battery circuit 8. Under the effect of the battery voltage $U_B$ a supply current (battery current) flows in the battery circuit 8 with a battery current strength $I_B$.

In a drive mode of the converter 3 the submodules 5a-5c are connected in turn to the battery circuit 8 for feeding the phase windings 14 of the motor 2 with electrical energy from the battery 4. To this end the semiconductor switch 29 in the input bridge 20 of the respective submodule to be connected 5a-5c is opened, so that the intermediate circuit capacitance 22 of this submodule 5a-5c is switched via the input terminals 9 and 10 and the semiconductor switch 30 into the battery circuit 8. In the event of regulation in this way a number of submodules 5a-5c, which changes over time, is connected. The remaining submodule or each remaining submodule 5a-5c on the other hand is disconnected from the battery circuit 4 in that the input terminals 9 and 10 of the submodules 5a-5c are short-circuited by the respective associated semiconductor switch 29.

For a positive current flow direction of the battery current flowing in the battery circuit 8 the intermediate circuit capacitance 22 of the respectively connected submodule 5a-5c is charged from the battery circuit 8, so that the intermediate circuit voltage $U_{Z1}$-$U_{Z3}$ falling via the intermediate circuit capacitance 22 increases.

The input bridge 20 of the respective connected submodule 5a-5c is operated in this case in conjunction with the inductance 7 as a boost converter. The semiconductor switch 29 is switched on and off clocked for this purpose in a timed alternation, especially with a predetermined degree of control (pulse duty ratio). The second semiconductor switch 30 of the input bridge 20 is preferably always switched opposite to the semiconductor switch 29.

In an energy recovery mode the converter 3 can alternately also be employed for feeding back electrical energy into the battery circuit 8. While creating a negative current flow direction in the battery circuit 8 the input bridges 20 of the submodules 5a-5c are operated here as buck converters in that the semiconductor switch 30 of the respective submodules 5a-5c is alternately switched on and off, especially once again in a clocked manner. In energy recovery mode as well the semiconductor switch 29 in this case is preferably always activated in opposition to the semiconductor switch 30.

To activate the semiconductor switches 29 and 30 of each submodule 5a-5c the gate terminals of the semiconductor switches 29 and 30 each have an input control signal $E_1$-$E_3$ applied to them by the control unit 6. In an exemplary definition the input control signals $E_1$-$E_3$ each involve a pulse signal fluctuating between the values "0" and "1", wherein the respective submodule 5a-5c is switched off by activation with the value "0" (semiconductor switch 29 closed, semiconductor switch 30 opened), and is switched on by activation with the value "1" (semiconductor switch 29 opened, semiconductor switch 30 closed). In return the control unit 6 receives from the submodules 5a-5c as an input variable in each case a measured value of the intermediate circuit voltage $U_{Z1}$-$U_{Z3}$. The intermediate circuit voltage $U_{Z1}$-$U_{Z3}$ is tapped off for this purpose in each submodule 5a-5c in each case by means of a measuring converter 39 (FIG. 1), which supplies to the control unit 6 a voltage signal proportional to the respective intermediate circuit voltage $U_{Z1}$-$U_{Z3}$.

As a further input variable the control unit 6 receives a measured value of the battery current strength $I_B$, which is tapped off by a measurement converter 40 (FIG. 1) in the battery circuit 8 and is fed to the control unit 6 in the form of a current-proportional voltage signal for example.

Through the control unit 6 the intermediate circuit voltages $U_{Z1}$-$U_{Z3}$ of the submodules 5a-5c are regulated to a respectively assigned target voltage value $U_{Z10}$, $U_{Z20}$ or $U_{Z30}$. The target voltage values $U_{Z10}$-$U_{Z30}$ in this case in normal applications of the inventive converter 3 are predetermined specifically for each submodule 5a-5c and can accordingly also be defined with a different amount. In the simple application case according to FIG. 1, in which the submodules 5a-5c operate the identically designed phase windings 14 of the same motor 2, the target voltage values $U_{Z10}$-$U_{Z30}$ are however expediently defined in a uniform manner to the same amount ($U_{Z10}=U_{Z20}=U_{Z30}$). In addition to the regulation of the intermediate circuit voltages $U_{Z1}$-$U_{Z3}$ the control unit 6 also regulates the battery current strength $I_B$.

Figure 3:
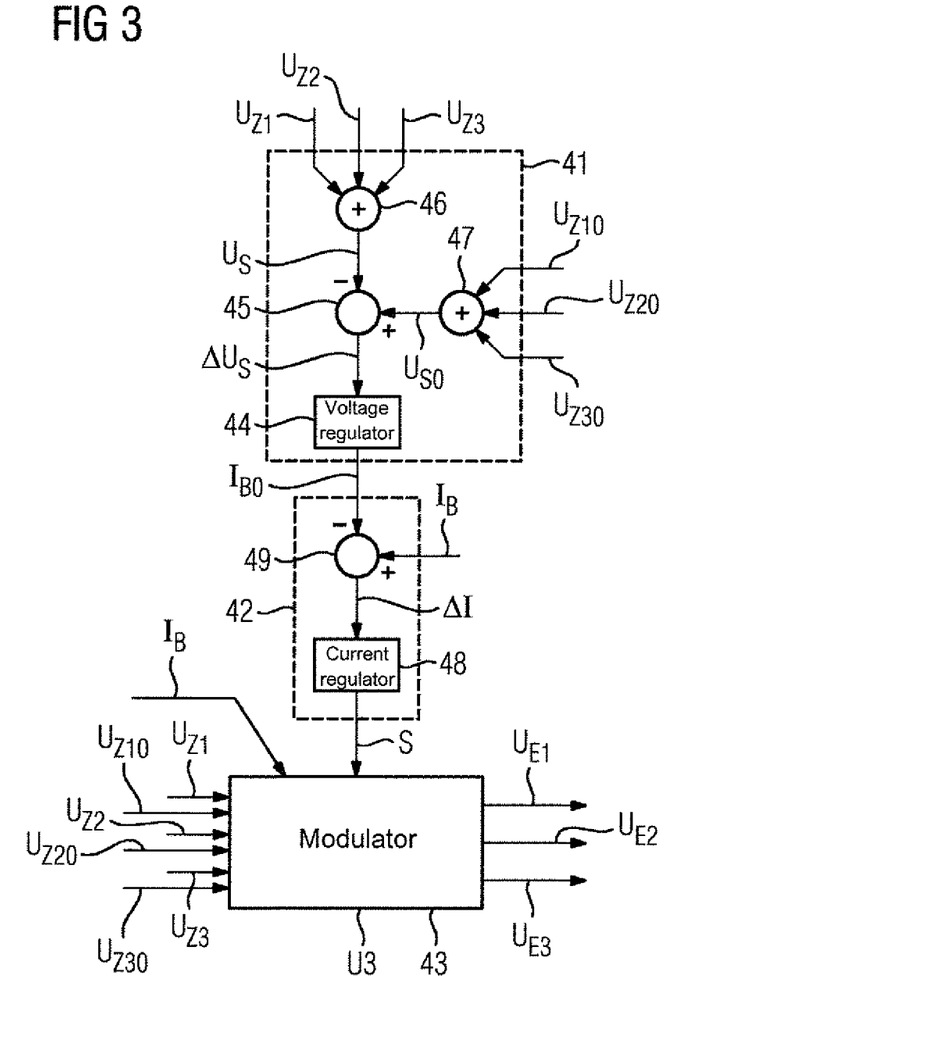
FIG. 3 shows the control unit according to FIG. 1 in a schematic block diagram.

To carry out this regulation method the control unit 6 in accordance with FIG. 3 includes a voltage regulation module 41, a current regulation module 42 connected downstream of said module and also a modulator 43 in its turn connected downstream of the current regulation module 42.

The voltage regulation module 41 in its turn is divided into a voltage regulator 44, a differential element 45 connected upstream from said regulator as well as two sum elements 46 and 47 connected upstream in their turn.

The sum element 46 here is fed with the measured values of the intermediate circuit voltages $U_{Z1}$-$U_{Z3}$ obtained in the submodules 5a-5c as input variables. The sum element 46 calculates a sum voltage $U_S$ (with $U_S=U_{Z1}+U_{Z2}+U_{Z3}$) from said values. In a corresponding manner the sum element 47 calculates from the target supplied voltage values $U_{Z10}$-$U_{Z30}$ a sum target voltage value $U_{S0}$ (with $U_{S0}=U_{Z10}+U_{Z20}+U_{Z30}$). Provided there is no provision for a change of the sum target voltage values $U_{Z10}$-$U_{Z30}$ in operation of the converter 3, the sum element 47 can optionally be emitted. Instead in this case the sum target voltage value $U_{S0}$ is preferably held directly as a constant in the control unit 6.

The differential element 45 calculates from the comparison of the sum voltage $U_S$ with the target sum voltage value $U_{S0}$ a sum voltage deviation $\Delta U_S$ (with $\Delta U_S = U_{S0} - U_S$).

The sum voltage deviation $\Delta U_S$ is fed as a guide variable to the voltage regulator 44—expediently embodied as a Proportional-Integral regulator (PI regulator). Depending on the absolute value and the timing curve of the sum voltage deviation $\Delta U_S$ the voltage regulator 44 determines a target current value $I_{B0}$ and supplies this to the current regulation module 42 as an input variable.

The current regulation module 42 is divided into a current regulator 48 as well as an upstream differential element 49.

The differential element 49 here establishes, by comparing the measured value of the battery current strength $I_B$ with the target current value $I_{B0}$, a current deviation $\Delta I$ (with $\Delta I = I_{B0} - I_B$), which is fed as a guide variable to the current regulator 48 again expediently embodied as a PI regulator. In accordance with the absolute value and timing curve of the current deviation $\Delta I$ the current regulator 48 calculates a control variable S, which is fed to the modulator 43 as an input variable. The control variable S in this case corresponds to that voltage which should fall in total over the input bridges 20 of the submodules 5a-5c connected in series.

The current regulation module 42, by comparison with the voltage regulation module 41, has a significantly shorter response time. The current regulation module 42 can thus rapidly effectively regulate out current fluctuations, while the voltage regulation module 41 serves to adapt the average battery current strength $I_B$ to the changing power requirement of the motor 2.

In addition to the control variable S, the modulator 43 is also supplied with the measured values of intermediate circuit voltages $U_{Z1}$-$U_{Z3}$ and the associated target voltage values $U_{Z10}$-$U_{Z30}$ as well as the measured value of the battery current strength $I_B$ as further input variables.

Figure 4:
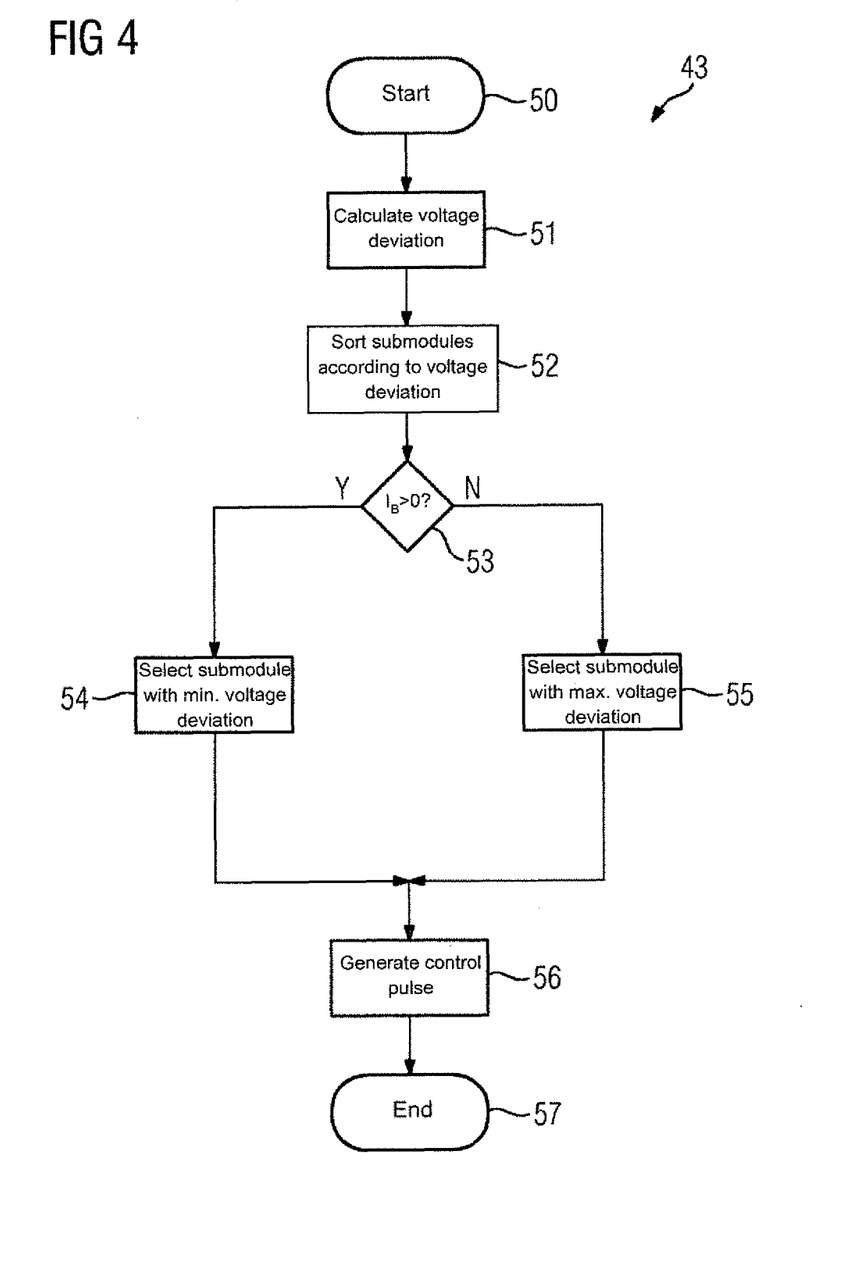
FIG. 4 shows a flow diagram of a method carried out by a modulator of the control unit for activating the input bridges of the submodules.

In accordance with these input variables the modulator 43 creates the respective input control signal $E_1$-$E_3$ for the input bridges 20 of the submodules 5a-5c in accordance with a method presented in greater detail in FIG. 4.

Then the modulator 43, in a first step 51 following the process start 50, calculates for each submodule 5a-5c separately in each case the voltage deviation of the respective intermediate circuit voltage $U_{Z1}$-$U_{Z3}$ from the assigned target voltage value $U_{Z10}$-$U_{Z30}$.

In a following step 52 the modulator 43 the submodule 5a-5c sorts the submodules in accordance with the size of the respective assigned voltage deviation.

In a further step 53 the modulator 43 checks whether the battery current strength $I_B$ and thus the current flow direction in the battery circuit 8 are positive ($I_B>0$).

If they are (Y) the modulator 43, in a step 54, selects the submodule 5a-5c with the minimum voltage deviation ($\min\{U_{Z1}-U_{Z10}; U_{Z2}-U_{Z20}; U_{Z3}-U_{Z30};\}$) as well as if necessary one or more submodules 5a-5c with the next largest voltage deviation and determines for each selected submodule 5a-5c an assigned degree of control for the clocked activation of the input bridge 20, so that the sum of the target voltages $U_{Z01}$-$U_{Z03}$ of the selected submodules 5a-5c averaged over time corresponds to the control variable S. In this case the modulator 43 assigns to the submodule 5a-5c with the minimum voltage deviation a greater degree of control than possibly to further selected submodules 5a-5c with a greater voltage deviation.

Thus the modulator 43 assigns the submodule 5a-5c with the minimum voltage deviation a degree of control of between 0 and 1 if the control variable S corresponds to a voltage between 0 and the target voltage value $U_{Z01}$-$U_{Z03}$ of this submodule 5a-5c while it allocates the remaining submodules the degree of control 0.

If the control variable S on the other hand corresponds to a voltage which lies between the target voltage value $U_{Z01}$-$U_{Z03}$ of the submodule 5a-5c with the minimum voltage deviation and the sum of the target voltage values $U_{Z01}$-$U_{Z03}$ of this submodule 5a-5c and of the submodule with the next greatest voltage deviation, the modulator 43 assigns the submodule 5a-5c with the minimum voltage deviation the degree of control 1 and the submodule 5a-5c with the next greatest voltage deviation a degree of control between 0 and 1. The remaining submodule 5a-5c on the other hand is activated with the degree of control 0.

If the control variable S finally corresponds to a voltage which lies between the sum of the target voltage values $U_{Z01}$-$U_{Z03}$ of the submodule 5a-5c with the minimum voltage deviation and the sum target voltage value $U_{S0}$, the modulator 43 assigns the submodule 5a-5c with the minimum voltage deviation and the submodules 5a-5c with the next greatest voltage deviation in each case the degree of control 1 and the submodules 5a-5c with the greatest voltage deviation a degree of control between 0 and 1.

Where the condition tested in step 53 produces a negative (N) result and thus a negative current flow direction ($I_B<0$) obtains in the battery circuit 8, the modulator 43, in a step 55, selects that submodule 5a-5c with the maximum voltage deviation (max{$U_{Z1}$-$U_{Z10}$;$U_{Z2}$-$U_{Z20}$;$U_{Z3}$-$U_{Z30}$;}) and if necessary one or more submodules 5a-5c with the next smallest voltage deviation and determines for each selected submodule 5a-5c an assigned degree of control for the activation of the input bridge 20, so that the sum of the target voltages $U_{Z01}$-$U_{Z03}$ of the selected submodules 5a-5c averaged over time corresponds to the control variable S. In this case the modulator 43—conversely similarly to the method step 54—assigns to the submodule 5a-5c with the maximum voltage deviation a greater degree of control than possibly further selected submodules 5a-5c with a smaller voltage deviation.

In a step 56 the modulator 43 creates in the following clock cycle of the input control signals $E_1$-$E_3$ in each case a control pulse and a pulse pause following said pulse with the degree of control determined in step 54 or 55 respectively.

In an exemplary case in which all submodules 5a-5c have the same common target voltage value $U_{Z10}$=$U_{Z20}$=$U_{Z30}$=100V predetermined for them, and the control variable S corresponds to a voltage of 160 V, the modulator 43 defines the degree of control of the submodules 5a-5c such that, averaged over time, 1.6 submodules are connected in each clock cycle. It is assumed that the intermediate circuit voltages $U_{Z1}$, $U_{Z2}$ and $U_{Z1}$ have the values 93V, 88V or 104V so that the submodule 5b has the minimum voltage deviation of $U_{Z2}$-$U_{Z20}$=–12V, the submodule 5a has the next greatest voltage deviation of $U_{Z1}$-$U_{Z10}$=–7V and the submodule 5c has the greatest voltage deviation of $U_{Z1}$-$U_{Z10}$=+4V. In this case the modulator 43, for a positive current direction ($I_B$>0) in accordance with step 54, activates the submodule 5b with the degree of control 1, the submodule 5a with the degree of control 0.6 and the submodule 5c with the degree of control 0. For a negative current direction ($I_B$<0) the modulator 43 on the other hand, in accordance with step 55 would activate the submodule 5c with the degree of control 1, the submodule 5a with the degree of control 0.6 and the submodule 5b with the degree of control 0.

The modulator 43 jumps from the end of the method 57 following step 56 back to the start of the method 50 after each clock cycle, so that the steps 51 to 56 are repeated cyclically. Thus, for each clock cycle of the input control signals $E_1$-$E_3$, the respective submodules 5a-5c to be connected are selected anew by the modulator.

The result achieved by the method described above is that with a positive current flow direction in the battery circuit 8, the submodule 5a-5c of which the intermediate circuit capacitance 22 has the—at least viewed relatively—lowest charge state is always at least connected to the battery circuit 8, so that this intermediate circuit capacitance 22 is preferably charged from the battery circuit 8.

Conversely, the modulator 43 means that with a negative current flow in the battery circuit 8, at least the submodule 5a-5c of which the intermediate circuit capacitance 22 has the—at least viewed relatively—highest charge state will always be connected to the battery circuit 8 so that this intermediate circuit capacitance is preferably discharged into the battery circuit 8.

At the same time the battery current strength $I_B$ is simultaneously adapted in line with demand by the control unit 6 by setting the degree of control of the input control signals $E_1$-$E_3$ while compensating for rapid current fluctuations.

Provided the target voltage value $U_{Z10}$-$U_{Z30}$ for all submodules 5a-5c is selected to be the same ($U_{Z10}$=$U_{Z20}$=$U_{Z30}$), the explicit determination of the voltage deviations in accordance with step 51 can optionally be omitted. In this case, in step 52 the submodules 5a-5c would be sorted directly in accordance with the amount of the intermediate circuit voltages $U_{Z1}$-$U_{Z3}$. In step 54 in such cases at least the submodule 5a-5c with the smallest intermediate circuit voltage $U_{Z1}$-$U_{Z3}$ would always be selected (min{$U_{Z1}$;$U_{Z2}$; $U_{Z3}$}), while in step 55 at least the submodule 5a-5c with the largest intermediate circuit voltage $U_{Z1}$-$U_{Z3}$ would always be selected (max{$U_{Z1}$;$U_{Z2}$ $U_{Z3}$}).

In an alternate method variant the submodules 5a-5c connected to the battery circuit 8 are not periodically determined anew by the modulator 43 but only when a corresponding demand is established. For a more detailed description of this method variant, the execution sequence of which is outlined in FIG. 5, it is assumed below—without restricting the general applicability—in simple terms that all submodules 5a-5c have the same target voltage value $U_{Z10}$-$U_{Z30}$ specified to them ($U_{Z10}$=$U_{Z20}$=$U_{Z30}$)

Figure 5:
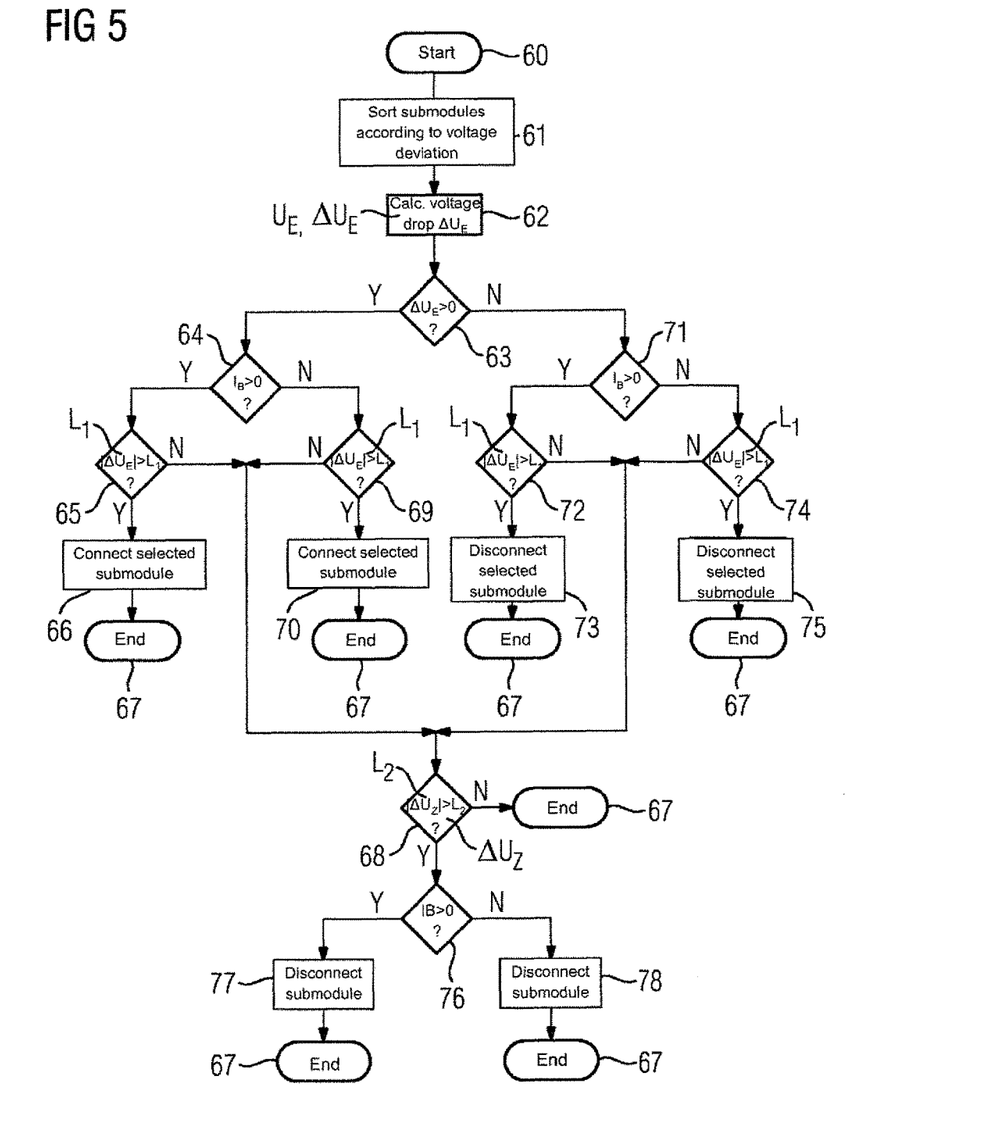
FIG. 5 shows in the diagram according to FIG. 4, an alternate form of embodiment of the method.

After the start of the method 60 the modulator 43 in accordance with FIG. 5, in a first step 61, again arranges the submodules 5a-5c in accordance with the size of the respective assigned intermediate circuit voltage $U_{Z1}$-$U_{Z3}$.

In a following step 62 the modulator 43 calculates the voltage which actually drops over the input bridges 20 of the submodules 5a-5c connected in series in total. This voltage, subsequently referred to as the effective voltage $U_E$ (FIG. 1), depends on the switching state of the semiconductor switches 29 and 30 of the input bridges 20, and thus on the value of the input control signals $E_1$-$E_3$, and is given in concrete terms by $$U_E = E_1 \cdot U_{Z1} + E_2 \cdot U_{Z2} + E_3 \cdot U_{Z3}$$

In addition the modulator 43 calculates the deviation of the effective voltage $U_E$ from the control variable S, which represents the associated target value. This deviation is subsequently referred to as the (effective) voltage deviation $\Delta U_E$ (with $\Delta U_E$=S–$U_E$).

In a further step 63, the modulator 43 checks whether the voltage deviation $\Delta U_E$ is positive ($\Delta U_E$>0), i.e. whether the effective voltage $U_E$ is below the adjustment value S ($U_E$<S).

If it is (Y), the modulator 43, in a step 64, checks whether the battery current strength $I_B$ and thus the current flow direction in the battery circuit 8 are positive ($I_B$>0).

If they are (Y), the modulator 43, in a step 65, selects from the disconnected submodules 5a-5c that submodule 5a-5c with the smallest intermediate circuit voltage $U_{Z1}$-$U_{Z3}$. Furthermore, the modulator 43 checks whether the absolute amount of the voltage deviation $\Delta U_E$ exceeds a first switching value $L_1$ (|$\Delta U_E$|>$L_1$), which is equated here to half the amount of the intermediate circuit voltage $U_{Z1}$-$U_{Z3}$ of this selected submodule 5a-5c ($L_1$=min{$U_{Zj}$ with j∈1, 2, 3 and Ej=0}/2).

Provided the condition is fulfilled (Y), the modulator 43, in a step 66, connects this selected submodule 5a-5c and jumps to the method end 67. If not (N), the modulator 43 jumps to a step 68.

Under the conditions $\Delta U_E$>0 ($U_E$<S) and $I_B$>0 the modulator 43, in step 66, in other words connects the (previously disconnected) submodule 5a-5c with the smallest intermediate circuit voltage $U_{Z1}$-$U_{Z3}$, if the absolute amount of the voltage deviation $\Delta U_E$ exceeds half the intermediate circuit voltage $U_{Z1}$-$U_{Z3}$ of this submodule 5a-5c.

Provided the battery current strength $I_B$ and thus the direction of current flow in the battery circuit 8 are negative ($I_B$<0), and the check made in step 64 thus has a negative result (N), the modulator 43, in a step 69, selects from the disconnected submodules 5a-5c that submodule 5a-5c with the largest intermediate circuit voltage $U_{Z1}$-$U_{Z3}$. Once again the modulator 43 checks whether the absolute amount of the voltage deviation $\Delta U_E$ exceeds the switching value $L_1$ ($|\Delta U_E|>L_1$), which is once again equated with half the amount of the intermediate circuit voltage $U_{Z1}$-$U_{Z3}$ of this selected submodule $5a$-$5c$ ($L_1$=max$\{U_{Zj}$ with j$\in$1, 2, 3 and $E_j$=0$\}$/2).

Provided this condition is fulfilled (Y), the modulator 43, in a step 70, connects this selected submodule $5a$-$5c$ and jumps to the end of the method 67. If not (N), the modulator 43 jumps to step 68.

Under the conditions $\Delta U_E$>0 ($U_E$<S) and $I_B$<0 in other words the modulator 43, in step 70, connects the (previously disconnected) submodule $5a$-$5c$ with the largest intermediate circuit voltage $U_{Z1}$-$U_{Z3}$, if the absolute amount of the voltage deviation $\Delta U_E$ exceeds half the intermediate circuit voltage $U_{Z1}$-$U_{Z3}$ of this submodule $5a$-$5c$.

Where the voltage deviation $\Delta U_E$ is negative ($\Delta U_E$<0) and thus the check already made in step 63 has a negative (N) result, the modulator 43 again checks in a step 71 whether the battery current strength $I_B$ and thus the current flow direction in the battery circuit 8 positive ($I_B$>0).

If they are (Y), the modulator 43, in a step 72, selects from the disconnected submodules $5a$-$5c$ the submodule $5a$-$5c$ with the largest intermediate circuit voltage $U_{Z1}$-$U_{Z3}$. The modulator 43 further checks whether the absolute amount of the voltage deviation $\Delta U_E$ exceeds the switching value $L_1$ ($\Delta U_E|>L_1$), which is again equated with half the amount of the intermediate circuit voltage $U_{Z1}$-$U_{Z3}$ of this selected submodule $5a$-$5c$ ($L_1$=max$\{U_{Zj}$ with j$\in$1, 2, 3 and $E_j$=1$\}$/2).

Where this condition is fulfilled (Y), the modulator 43, in a step 73, disconnects this selected submodule $5a$-$5e$ and jumps to the end of the method 67. If not (N), the modulator 43 jumps to a step 68.

Under the conditions $\Delta U_E$<0 ($U_E$>S) and $I_B$>0. the modulator 43, in step 73, in other words disconnects the (previously connected) submodule $5a$-$5c$ with the largest intermediate circuit voltage $U_{Z1}$-$U_{Z3}$ if the absolute amount of the voltage deviation $\Delta U_E$ exceeds half the intermediate circuit voltage $U_{Z1}$-$U_{Z3}$ of this submodule $5a$-$5c$.

Provided the battery current strength $I_B$ and thus the current flow direction in the battery circuit 8 are negative ($I_B$<0), and the result of the check made in step 71 is thus negative (N), the modulator 43, in a step 74, selects from the disconnected submodules $5a$-$5c$ that submodule $5a$-$5c$ with the smallest intermediate circuit voltage $U_{Z1}$-$U_{Z3}$. Once again the modulator 43 checks whether the absolute amount of the voltage deviation $\Delta U_E$ exceeds the switching value $L_1$ ($|\Delta U_E|>L_1$) which is once again equated with half the amount of the intermediate circuit voltage $U_{Z1}$-$U_{Z3}$ of this selected submodule $5a$-$5c$ ($L_1$=min$\{U_{Zj}$ with j$\in$1, 2, 3 and $E_j$=1$\}$/2).

Where this condition is fulfilled (Y), the modulator 43, in a step 75, disconnects this selected submodule $5a$-$5c$ and jumps to the end of the method 67. If not (N), the modulator 43 jumps to the step 68.

Under the conditions $\Delta U_E$<0 ($U_E$>S) and $I_B$<0 the modulator 43, in step 75, in other words disconnects the (previously connected) submodule $5a$-$5c$ with the smallest intermediate circuit voltage $U_{Z1}$-$U_{Z3}$, if the absolute amount of the voltage deviation $\Delta U_E$ exceeds half the intermediate circuit voltage $U_{Z1}$-$U_{Z3}$ of this submodule $5a$-$5c$.

Unless otherwise established in one of steps 65, 69, 72 or 74 that the first switching value $L_1$ is not exceeded (N), the modulator 43, in the step 68, determines the deviation $\Delta U_Z$ of the intermediate circuit voltages $U_{Z1}$-$U_{Z3}$ of all submodules $5a$-$5c$ ($\Delta U_Z$=max$\{U_{Z1};U_{Z2};U_{Z3}\}$−min$\{U_{Z1};U_{Z2};U_{Z3}\}$) and checks whether this deviation $\Delta U_Z$ exceeds a predetermined second switching value L2 ($\Delta U_Z$>$L_2$).

Where this condition is not fulfilled (N), the modulator 43 jumps to the end of the method 67.

Otherwise, if it is fulfilled (Y), the modulator swaps one of the connected submodules $5a$-$5c$ for one of the disconnected submodules $5a$-$5c$. To do this the modulator 43 initially once again checks, in a step 76, whether the battery current strength $I_B$ and thus the current flow direction in the battery circuit 8 positive ($I_B$>0).

If they are (Y) the modulator 43, in a step 77, disconnects the (previously connected) submodule $5a$-$5c$ with the largest intermediate circuit voltage $U_{Z1}$-$U_{Z3}$ and connects the (previously disconnected) submodule $5a$-$5c$ with the smallest circuit voltage $U_{Z1}$-$U_{Z3}$ and jumps to the end of the method 67.

If not (N), the modulator 43, in a step 78, disconnects the (previously connected) submodule $5a$-$5c$ with the smallest intermediate circuit voltage $U_{Z1}$-$U_{Z3}$ and connects the (previously disconnected) submodule $5a$-$5c$ with the largest intermediate circuit voltage $U_{Z1}$-$U_{Z2}$ and likewise jumps to the end of the method 67.

The method according to FIG. 5 is continuously repeated by the modulator 43. In the course of the case differentiation undertaken in steps 63 to 75, the modulator 43 in such cases always switches submodules $5a$-$5b$ on or off, if doing so enables the effective voltage $U_E$ to be better matched to the control variable S, wherein it selects the submodule $5a$-$5c$ to be switched on or off such that the intermediate circuit voltages $U_{Z1}$-$U_{Z3}$ are synchronized as well as possible to each other. Likewise the modulator 43, in the course of the case differentiation undertaken in steps 68 and 76 to 78, differentiates between the submodules $5a$-$5c$, such that the intermediate circuit voltages $U_{Z1}$-$U_{Z3}$ are synchronized with one another in the best possible way. Unlike the method variant in accordance with FIG. 4, the modulator 43, in a method according to FIG. 5 does not switch the submodules $5a$-$5c$ on or off in a periodic clock cycle, but only when required—thus if in one of the steps 65, 69, 72, 74 or 68 the exceeding of the respective switching value $L_1$ or $L_2$ is established.

The control unit 6 is formed in a preferred embodiment by a microcontroller in which the functionality for carrying out the regulation method described here with reference to FIGS. 3 to 5 is implemented in software technology. Thus in particular the voltage regulation module 41, the current regulation module 42 and the modulator 43 are formed by software modules which use the hardware of the microcontroller for creating the input control signals $E_1$-$E_3$.

Although the invention becomes particularly clear with reference to the exemplary embodiments described here, it is not restricted to said embodiments. Instead further forms of embodiment of the invention can be derived from the present description.

In particular the converter 3 can include more (or fewer) than the three submodules $5a$-$5c$. Thus the converter 3 can especially be used to supply a number of independent loads. For example the converter 3 drives four electric motors, each of which is assigned to a wheel of the vehicle. In this case the converter includes a submodule in each case for each phase winding of each electric motor.

What is claimed is:

1. A method for operating a modular high-frequency converter, which comprises a plurality of submodules, each submodule having an input-side with a half bridge and an output-side with an at least single phase full bridge, and an intermediate circuit capacitance connected in parallel with an output-side of the half bridge and with an input-side of the at least single phase full bridge to form a DC voltage intermediate circuit, wherein the input-sides of the half bridges of the plurality of submodules are connected in series to a power supply circuit fed from a DC voltage source via an inductance, the method comprising:

connecting the input-sides of the half bridges of the submodules alternately to the power supply circuit to thereby connect the intermediate circuit capacitance of a connected submodule to the power supply circuit;

measuring an intermediate circuit voltage dropping across the intermediate circuit capacitance of each connected submodule;

selecting the connected submodule or each connected submodule in accordance with a voltage deviation of the measured intermediate circuit voltage from a predetermined target voltage value and connecting the selected submodule having a maximum or a minimum voltage deviation to the power supply circuit;

determining a sum voltage formed by adding the intermediate circuit voltages of all submodules;

in accordance with the deviation of the sum voltage from a sum of the target voltage values, determining a target current value for a current flowing through the power supply circuit; and regulating the current flowing through the power supply circuit to the target current value by selectively connecting and disconnecting submodules.

2. The method of claim 1, further comprising:
determining a direction of a current flowing in the power supply circuit;
when the direction of the current is positive, always connecting to the power supply circuit at least the submodule having the minimum voltage deviation; and
when the direction of the current is negative, always connecting to the power supply circuit at least the submodule having the maximum voltage deviation.

3. The method of claim 1, wherein the input-side of the half bridge of a connected submodule or of each connected submodule is clocked with an input control signal.

4. The method of claim 3, wherein a different submodule to be connected is selected for each clock cycle of the input control signal.

5. The method of claim 1, further comprising:
determining an effective voltage formed by adding the intermediate circuit voltages of all connected submodules; and
changing a connected submodule when the effective voltage deviates from a predetermined target value by more than a predetermined switching value.

6. The method of claim 5, wherein the predetermined switching value is defined as half the intermediate circuit voltage of the selected submodule.

7. A modular high-frequency converter, comprising:
a plurality of submodules, each submodule having an input-side with a half bridge and an output-side with an at least single phase full bridge, and an intermediate circuit capacitance connected in parallel with an output-side of the half bridge and with an input-side of the at least single phase full bridge to form a DC voltage intermediate circuit, wherein the input-sides of the half bridges of the plurality of submodules are connected in series to a power supply circuit fed from a DC voltage source via an inductance, and a control device configured to
connect the input-sides of the half bridges of the submodules alternately to the power supply circuit to thereby connect the intermediate circuit capacitance of a connected submodule to the power supply circuit;
measure an intermediate circuit voltage dropping across the intermediate circuit capacitance of each connected submodule;
select the connected submodule or each connected submodule in accordance with a voltage deviation of the measured intermediate circuit voltage from a predetermined target voltage value and connect the selected submodule having a maximum or a minimum voltage deviation to the power supply circuit;
determine a sum voltage formed by adding the intermediate circuit voltages of all submodules;
in accordance with the deviation of the sum voltage from a sum of the target voltage values, determine a target current value for a current flowing through the power supply circuit; and
regulate the current flowing through the power supply circuit to the target current value by selectively connecting and disconnecting submodules.

* * * * *